United States Patent Office 2,722,533
Patented Nov. 1, 1955

2,722,533

PREPARATION OF SUBSTITUTED PHTHALIDES

Samuel Kushner, Nanuet, N. Y., assignor to American Cyanamid Company, New York, N. Y., a corporation of Maine No Drawing. Application May 3, 1952,
Serial No. 286,033

4 Claims. (Cl. 260—343.3)

This invention relates to certain new substituted phthalides and methods of preparing the same. More particularly this invention relates to new 3-methyl-phthalide compounds which can be represented by the following general formula:

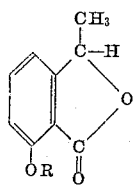

in which R represents a member selected from the group consisting of hydrogen and lower alkyl radicals, for instance methyl, ethyl, and propyl.

The new compounds of this invention are stable crystalline solids which are useful as intermediates in organic synthesis. For instance, the new compounds are of value in the preparation of compounds having fungicidal activity by the methods disclosed in copending application S. N. 286,034 filed concurrently herewith.

While it is not intended that the new invention be limited to the above new class of compounds when prepared by any one particular procedure, a convenient method of preparing the new compounds has been discovered and it is intended that this new method also constitute a part of the present invention.

According to the new process of this invention a 2-cyano - alpha - hydroxyethylbenzene compound is hydrolyzed in the presence of a hydrolyzing agent to give the corresponding 3-methyl-phthalide as may be illustrated by the following general equation:

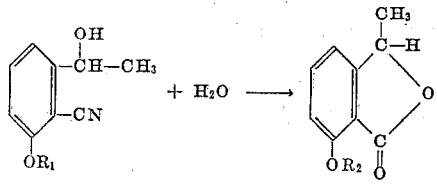

in which $R_1$ and $R_2$ are members selected from the group consisting of hydrogen and lower alkyl radicals. As will be apparent to those skilled in the art, $R_1$ and $R_2$ in the above equation will ordinarily be the same; however, when a relatively high temperature and a very strong hydrolyzing agent, for instance 48% hydrobromic acid, are employed, it is possible to have $R_1$ represent an alkyl group and $R_2$ represent hydrogen. This is simply because the strong hydrolyzing agent not only results in the hydrolysis of the cyano group as desired, but also results in the hydrolysis of the alkoxy group.

As will be seen from the above general equation, water is a reactant in the new process of this invention. While water need only be present in approximately stoichiometrical amounts, improved results can usually be obtained by employing an excess. This not only results in an increased yield, but the excess water also acts as a solvent for the reaction. Various water miscible inert organic solvents, for instance dioxane and dimethyl formamide, can also be employed, if desired, although their use is not usually advantageous. In some instances, it is advantageous to employ a water immiscible organic solvent for the reaction product, for instance benzene or toluene, whereby the desired product is recovered in the organic layer after completion of the reaction. Such a process is disclosed in detail in the examples to follow.

Suitable hydrolyzing agents, which can be employed as catalysts in the new reaction of this invention, are the mineral acids, for instance hydrochloric acid, hydrobromic acid, sulfuric acid, and phosphoric acid; and the alkali bases, for instance sodium hydroxide and potassium hydroxide. Such hydrolyzing agents are effective when employed in catalytic amounts, but as a general rule it is advantageous to employ the hydrolyzing agent in a considerable excess. Of course, with strong acids, such as sulfuric, the hydrolyzing agent should not be employed in such strong concentrations as to destroy the organic reactant or the reaction product. As a general rule when acid catalysts are employed, an advantageous concentration is from about a 2 to 8 normal solution, and with alkali catalysts an advantageous concentration is generally from about a .05 to 5 normal solution.

It is an advantage of the new process of this invention that the reaction conditions employed may be varied within relatively wide limits. Although the exact operable temperature range in each instance depends upon the particular hydrolyzing agent employed, the new reaction can be successfully performed at temperatures of from about 40° C. to 140° C. As illustrative examples, when hydrochloric acid is employed as a hydrolyzing agent, temperatures from about 40° C. to 100° C. or the reflux temperature of the reaction mixture are satisfactory; when hydrobromic acid is employed as a hydrolyzing agent, temperatures of from about 40° C. to 80° C. are satisfactory for hydrolysis of the cyano group without hydrolysis of an alkoxy group and temperatures of from about 120° C. to 140° C. are advantageous if one desires to also hydrolyze an alkoxy substituent; with other mineral acids a satisfactory operating temperature range is usually from about 50° C. to 100° C. or the reflux temperature of the reaction mixture; and in alkali hydrolysis a satisfactory temperature range is usually from about 40° C. to the reflux temperature of the reaction mixture. The time required for relatively complete hydrolysis also depends upon a number of factors, including the temperature and the particular hydrolyzing agent employed, but as a general rule, from about one to forty-eight hours should be allowed. The following reaction times with the indicated hydrolyzing agent and temperatures have been found to be advantageous; about seven hours with hydrobromic acid at from about 130° C. to 140° C.; about forty-eight hours with hydrobromic acid at 40° C. to 50° C.; about sixteen hours with hydrobromic acid at 80° C.; about one hour with sodium hydroxide at 100° C.; about four hours with sodium hydroxide at 50° C. Of course, the above suggested reaction times are only advantageous minimums for a reasonably complete reaction and much longer reaction periods can ordinarily be employed without appreciable decomposition of the reaction product.

The invention will be more particularly illustrated by the following examples in which all parts are by weight unless otherwise indicated.

Example I 50 parts by weight of 2-amino-3-methoxy-alpha-hydroxyethylbenzene is dispersed in 100 parts by volume of 28% HCl and the resulting solution cooled to about 0° C. To the cooled solution there is slowly added, with vigorous stirring and cooling, 30 parts by weight of sodium nitrite in about 85 parts by volume of water. After a few minutes the solution is carefully neutralized with sodium carbonate.

Cuprous chloride (prepared from 150 parts by weight of copper sulphate) is suspended in about 200 parts by volume of cool water and a solution of 70 parts by weight of sodium cyanide in 100 parts by volume of water added slowly with stirring. The resulting sodium cyanide complex is cooled to about 0° C., and to the cooled solution there is added slowly, with vigorous stirring and cooling, the neutralized diazonium solution. The resulting mixture is held at a temperature of about 0° C. for an additional thirty minutes and then warmed slightly to about 50° C., with constant stirring. The mixture is then cooled and the resulting precipitate of 2 - cyano - 3 - methoxy-alpha-hydroxyethylbenzene removed and purified by recrystallization from benzene.

2 parts by weight of 2-cyano-3-methoxy-alpha-hydroxyethylbenzene is refluxed for five hours with 30 parts by volume of 48% hydrobromic acid and 30 parts by volume of benzene. The reaction mixture is allowed to cool, the benzene layer separated and the aqueous phase extracted twice with additional benzene. The combined benzene extracts are treated with activated charcoal (Norit-A), filtered, and the resulting filtrate concentrated under vacuum to a small volume. The resulting crystalline precipitate of 3-methyl-7-methoxyphthalide is removed by filtration.

Other 3-methoxy-7-alkoxyphthalides are prepared by same procedure as above. For instance, one can prepare 3-methyl-7-ethoxyphthalide by employing an equal molar quantity of 2-cyano-3-ethoxy-alpha-hydroxyethylbenzene (prepared from 2-amino-3-ethoxy-alpha-hydroxyethylbenzene by the procedure above) for the 2 - cyano - 3 - methoxy - alpha-hydroxyethylbenzene employed in the above example. Also, one can substitute other hydrolyzing agents, for instance 6 N HCl or 1 N NaOH, for the 48% hydrobromic acid employed in the above example.

Example II 8 parts by weight of 2-cyano-3-methoxy-alpha-hydroxyethylbenzene (prepared by the procedure of Example I) is refluxed for two hours in 150 parts by volume of 48% hydrobromic acid. There is then added 200 parts by volume of benzene and the resulting mixture again refluxed for three additional hours. The reaction mixture is cooled and extracted with an approximately equal volume of ether and benzene. The ether-benzene extract is evaporated to dryness to yield 3-methyl-7-hydroxyphthalide as a crystalline solid.

I claim:
1. The method of preparing phthalide compounds represented by the formula:

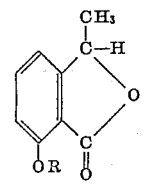

in which R represents a member selected from the group consisting of hydrogen and lower alkyl radicals, which comprises heating at a temperature of about 40° C. to 140° C., and in the presence of a hydrolyzing agent selected from the group consisting of mineral acids and alkali bases, a compound represented by the formula:

$$\begin{array}{c}\text{OH}\\|\\\text{—CH—CH}_3\\\text{—CN}\\|\\\text{OR}\end{array}$$

in which R is as defined above, with at least a stoichiometrical quantity of water.

2. A method of preparing 3-methyl-7-(lower alkoxyl)-phthalides which comprises heating, at a temperature of from about 40° C. to the reflux temperature of the reaction mixture, a 2-cyano-3-(lower alkoxy)-alpha-hydroxyethylbenzene in a 2 to 8 normal solution of a mineral acid.

3. A method of preparing 3-methyl-7-(lower alkoxy)-phthalides which comprises heating, at a temperature of from about 40° C. to the reflux temperature of the reaction mixture, a 2-cyano-3-(lower alkoxy)-alpha-hydroxyethylbenzene in a 0.5 to 5 normal solution of an alkali base.

4. A method of preparing 3-methyl-7-methoxyphthalide which comprises heating, at a temperature of from about 40° C. to 80° C., a 2-cyano-3-methoxy-alpha-hydroxyethylbenzene with a mixture of 48% hydrobromic acid and an aromatic water immiscible organic solvent.

References Cited in the file of this patent

UNITED STATES PATENTS

| | | |
|---|---|---|
| 2,088,633 | Bousquet et al. | Aug. 3, 1937 |
| 2,150,595 | Austin et al. | Mar. 14, 1939 |

FOREIGN PATENTS

| | | |
|---|---|---|
| 627,839 | Great Britain | Aug. 17, 1949 |

OTHER REFERENCES

Tamura, "Chem. Abst." (1940), vol. 34, p. 400.